United States Patent

[11] 3,620,707

| [72] | Inventor | Frans M. Van Damme<br>Blacksburg, Va. |
|---|---|---|
| [21] | Appl. No. | 857,888 |
| [22] | Filed | Sept. 15, 1969 |
| [45] | Patented | Nov. 16, 1971 |
| [73] | Assignee | Research Corporation<br>New York, N.Y. |

[54] GLASS-TUBE REFORMING APPARATUS
1 Claim, 6 Drawing Figs.

| [52] | U.S. Cl. | 65/271,<br>65/110, 65/277 |
|---|---|---|
| [51] | Int. Cl. | C03b 23/08 |
| [50] | Field of Search | 65/108,<br>110, 271, 277 |

[56] References Cited
UNITED STATES PATENTS

| 2,552,108 | 5/1951 | Molinari | 65/277 X |
|---|---|---|---|

FOREIGN PATENTS

| 943,997 | 10/1948 | France | 65/277 |
|---|---|---|---|
| 660,686 | 4/1963 | Canada | 65/277 |

Primary Examiner—Arthur D. Kellogg
Attorney—Stowell & Stowell

ABSTRACT: Apparatus is provided for converting glass tubes of circular cross section into tubes of larger cross-sectional dimensions and of any desired cross-sectional configuration such as square, rectangular, ovoidal, or triangular.

PATENTED NOV 16 1971
3,620,707
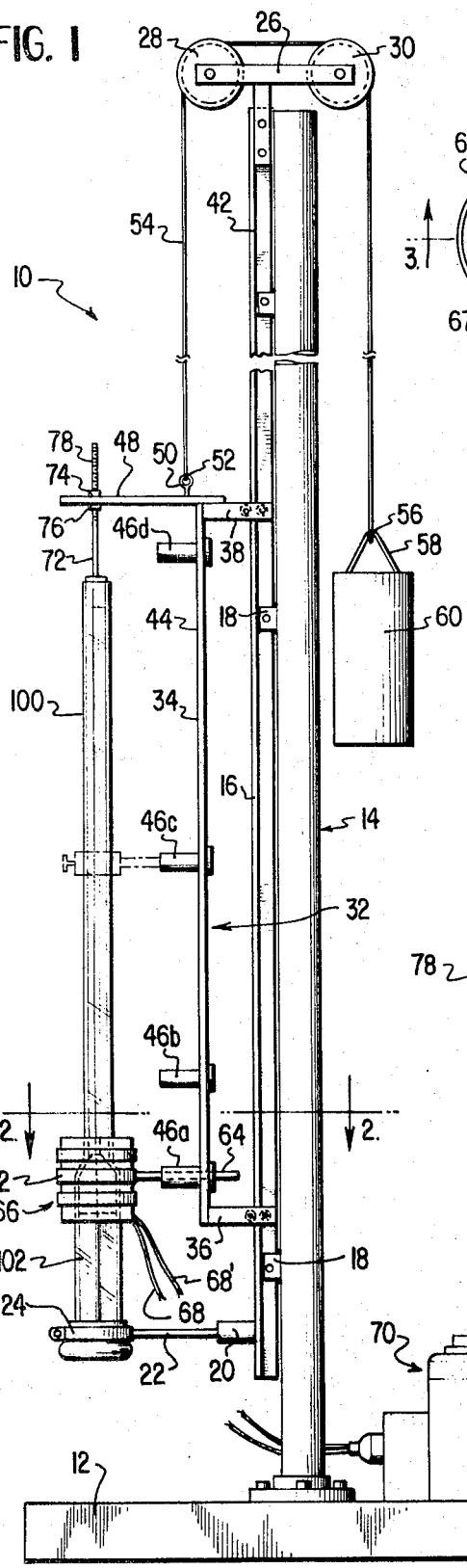
FIG. 1
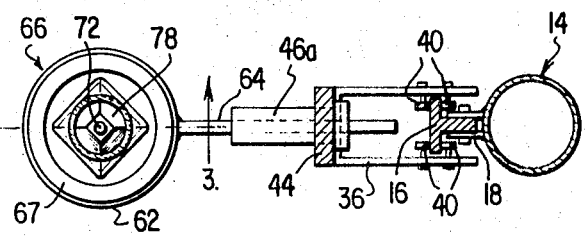
FIG. 2
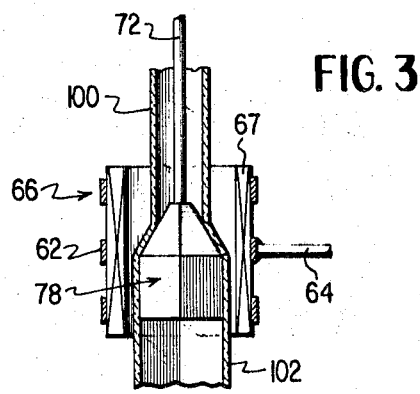
FIG. 3
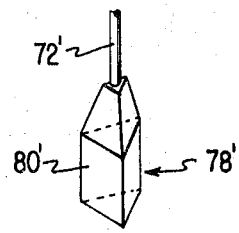
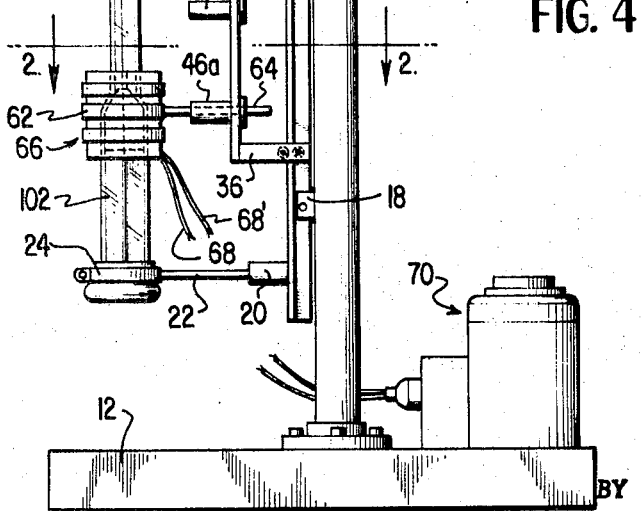
FIG. 4   FIG. 5
FIG. 6
INVENTOR
FRANS M. VAN DAMME
Stowell and Stowell
BY
ATTORNEYS.

GLASS-TUBE REFORMING APPARATUS

BACKGROUND OF THE INVENTION

Glass-tube reforming apparatus is known for making, for example, tubes having circular cross sections and accurate bores for use in making thermometers, pipettes, hypodermic syringe barrels and the like. However, basically such apparati employ a rotating former or mandrel or means are provided for rotating the glass tube or both the mandrel and the glass tube are relatively rotated.

THE INVENTION

It is a principal object of the present invention to provide apparatus for reforming preferably cylindrical glass tubes having circular cross sections into glass tubes having, for example, square, rectangular, oval, or triangular or any desired cross-sectional configuration.

One of the principal objects of the invention is to provide such apparatus that is relatively simple in form and reliable in use. Another of the features of the improved apparatus is that neither the glass tube nor the mandrel are rotated which materially reduces the expense and complexity of the machine.

A further object is to provide such an apparatus wherein the diameter or cross-sectional area and tube size may be variously modified without making any major machine adjustments.

These and other objects and advantages are provided in apparatus for automatically forming elongate hollow tubular glass articles having a predetermined cross-sectional configuration and wall thickness from a first cylindrical hollow tubular glass of a lesser cross section than the article to be formed comprising:

a. a fixed vertically positioned support member;
b. means mounting the first glass tube at the lower end of the fixed support;
c. a movable support member;
d. means mounting the movable support member for vertical sliding movement relative to the fixed support;
e. heater means supported at the lower end of the movable support and about the first glass tube and for movement with the movable support member;
f. a forming die having a cross-sectional dimension greater than the first tube and a configuration approximating the configuration of the tube to be formed;
g. means mounting the forming die within the glass tube and within the heating zone of the heater means;
h. means rigidly connecting the die-mounting means to the movable support member and for movement therewith; and
i. means connected to the movable support member for effecting upward-sliding movement of the movable support member relative to the fixed support member.

The invention will be more particularly described in reference to the accompanying drawing wherein:

FIG. 1 is a fragmentary vertical sectional view of apparatus constructed in accordance with the teachings of the present invention;

FIG. 2 is a section on line 2—2 of FIG. 1;

FIG. 3 is a section on line 3—3 of FIG. 2;

FIG. 4 is a fragmentary perspective view of a forming member for converting circular cross-sectional tubing into tubing having a quadrangular cross section;

FIG. 5 is a view similar to FIG. 4 of a triangular-forming member; and

FIG. 6 is a view similar to that illustrated in FIG. 4 of a forming member for constructing ovoidal tubes.

Referring to the drawing and in particular to FIGS. 1 through 4 thereof, 10 generally designates an embodiment of apparatus for automatically forming or reforming elongated hollow tubular glass articles. The apparatus 10 includes a base 12 having rigidly secured thereto a first vertically directed support member generally designated 14.

The standard or support member 14 has secured thereto a track member 16. The track 16 in the illustrated form of the invention comprises a T-bar as more clearly shown in FIG. 2 of the drawing which T-bar is secured to the first support member 14 by wings or brackets 18. Adjacent the lower end of the track member 16 is rigidly secured a fitting 20 which fitting receives a rod 22 carrying at its extended end a clamping mechanism 24.

The upper end of the track 16 has rigidly secured thereto a generally T-shaped fitting 26, the crossbar of which rotatably supports a pair of pulleys 28 and 30.

The assembly also includes a second or movable support member 32. The movable support member 32 includes an elongated bar 34 having secured to one face thereof at least of pair of U-shaped brackets 36 and 38, one at the upper end and one at the lower end of the bar. Each of the legs of each of the U-shaped brackets has secured thereto a pair of small rollers each designated 40. The rollers 40 are spaced such that the bar 42 of T-shaped track member 16 may be snugly received therein to permit relative sliding movement between the track 16 and the movable support member 32.

The opposite face 44 of the bar 34 has secured thereto a plurality of spaced fittings 46a, b, c and d. In addition, a plate member 48 is secured, such as by welding, to the upper end of the bar 34 and rigidity is provided for the plate member 48 by having it span a portion of the upper U-shaped member 38 as more clearly shown in FIG. 1 of the drawing.

The plate 48 carries an eye 50 which receives end 52 of a flexible draft member 54. The draft member is trained over the pair of pulleys 28 and 30 and its opposite end 56 is secured to the bale 58 of a hollow counterweight 60 into which suitable weights are placed as desired and as to be more fully described hereinafter.

One of the couplings 46a through d and preferably the lowermost 46a receives a clamping device 62 having an adjustable stem 64. The clamping device 62 receives a ring burner generally designated 66 which in the illustrated form of the invention is an electrical furnace composed of an alundum pipe grooved on its internal surfaces to receive resistance wires which are maintained in place with alundum cement. The leads 68 and 68', from the resistance wire, are connected to a suitable temperature-regulating means such as a 7 ampere Variac 70.

From the foregoing description it will be seen that as the movable guide member 32 moves upwardly relative to the stationary guide member 14 and its associated clamp 24 the furnace also moves in the same direction at the same speed.

The bracket 48 hereinbefore described receives at its upper end a metallic rod 72. The rod is positioned longitudinally and maintained in the desired position by a pair of locknuts 74 and 76 which engage threads 78 on the upper end of the rod 72. The lower end of the rod 72 receives a forming member generally designated 78. In FIGS. 1, 2 and 3 the forming member 78 is constructed of carbon and has a lower portion in the form of a cubical solid with a truncated pyramidal upper portion 82. The particular forming member or die 78 is for use in converting a circular tubular member into a tube which is square in transverse section.

As hereinbefore described the particular configuration of the former or die determines the final shape of the reformed glass tube. In FIG. 5 of the drawing the rod 72' is shown connected to a former 78' having a lower portion 80' of triangular cross section while in FIG. 6 the rod 72" is provided with a former 78" having an elliptical or oval shape in transverse cross section to form tubes having an ovoidal cross section.

As hereinbefore described the movable support member 32 is provided with additional clamp holders 46b, c and d which are useful when particularly long pipes or tubes are to be reshaped to provide the additional rigidity to the assembly.

In operation of the invention a glass tube 100 has its lower end 102 manually opened to receive the former or die 78. After the lower end 102 is opened, the lower end is passed through the ring burner 66 and the lower end is then clamped by clamping means 24 to the fixed support member 16. The former 78 is then inserted into the glass tube and is anchored such that it is in the zone of the burner 66. The former is anchored in the operating position illustrated in FIGS. 1 and 3 by the locking nuts 74 and 76. The Variac 70 is then energized and adjusted to provide the correct heating current to the coil of the burner. Weights are then added to the bucket 60 so that as the tube 100 is heated by the burner, the weight in the bucket 60 acting through the flexible draft member 54 the pulleys 28 and 30, and the connector 50 at the upper end of the movable stage 32 causes the movable frame to move upwardly advancing the burner or heater 66 and the former at a rate determined by the amount of weight in the bucket 60, the heat capacity of the burner, the working temperature of the glass, the diameter of the glass, etc.

With a burner about 55 mm. inner diameter and a length of about 100 mm., a Pyrex glass tube, 25 mm. inside diameter and 28 mm. outside diameter and with a carbon former about 1 inch on each face and with the temperature regulated to about 850° C., a square tube was pulled at the rate of about 3 centimeters per minute.

From the foregoing description of the illustrated form of the present invention it will be apparent to those skilled in the art that various modifications may be made in the apparatus without departing from the spirit of the invention. For example, where desired, a tube may be reformed such that one portion has a square cross section and another portion is triangular in cross section by merely stopping the process after, for example, the square portion of the tube has been reformed and substituting the triangular die for the square die.

I claim:

1. Apparatus for automatically forming elongated, hollow tubular glass articles having a predetermined cross-sectional configuration and wall thickness from a first cylindrical, hollow tubular glass of a lesser cross section than the article to be formed comprising:
   a. a fixed vertically positioned support member;
   b. means rigidly mounting the first glass tube at the lower end of said fixed support;
   c. an elongated carriage;
   d. a track carried by the fixed support member and cooperating track engaging members mounting the elongated carriage for vertical sliding movement relative to the fixed support;
   e. cylindrical heater means supported at the lower end of the movable carriage, about the first glass tube and for movement with the said carriage;
   f. first glass-tube support means rigidly carried by said carriage and adapted for sliding movement with the external surface of said first glass tube;
   g. a forming die having a cross diameter greater than the first tube and a configuration approximating the configuration of the tube to be formed;
   h. means mounting said die within the glass tube and within the heating zone of the heater means;
   i. means rigidly connecting the die-mounting means to the movable carriage and for movement therewith;
   j. means connected to the carriage for continuously urging the carriage, the forming die, and the cylindrical heater means in an upward direction relative to the fixed support;
   k. the said means for continuously urging the movable carriage, the forming die and the heater means upwardly relative to the fixed support and the first glass tube including at least one pulley carried by the upper end of the fixed support member; a flexible draft member trained over said pulley; and means attaching one end of the flexible draft member to the movable carriage and the opposite end to a suspended weight.

* * * * *